April 22, 1941.  G. A. LYON  2,239,368
METHOD OF FORMING A WHEEL COVER
Filed Aug. 2, 1937  4 Sheets-Sheet 1
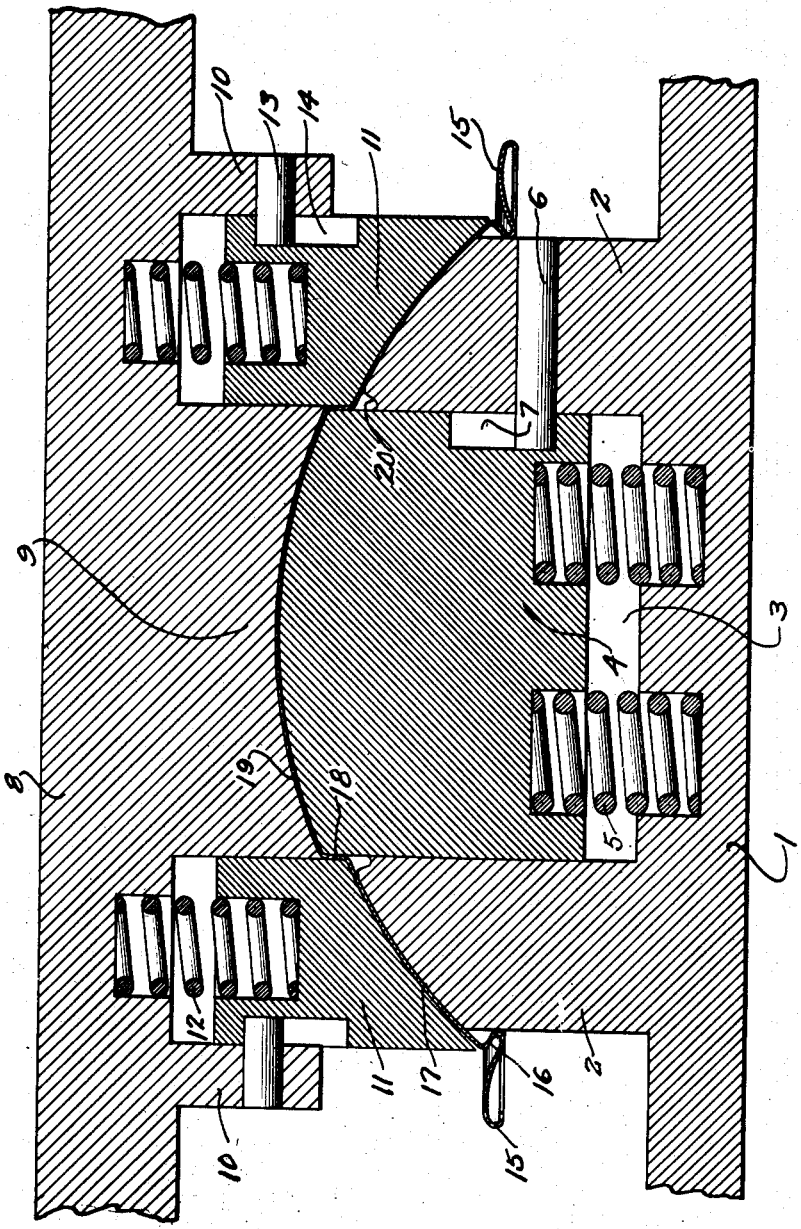
Inventor
GEORGE ALBERT LYON.
by Charles W. Allen Attys.

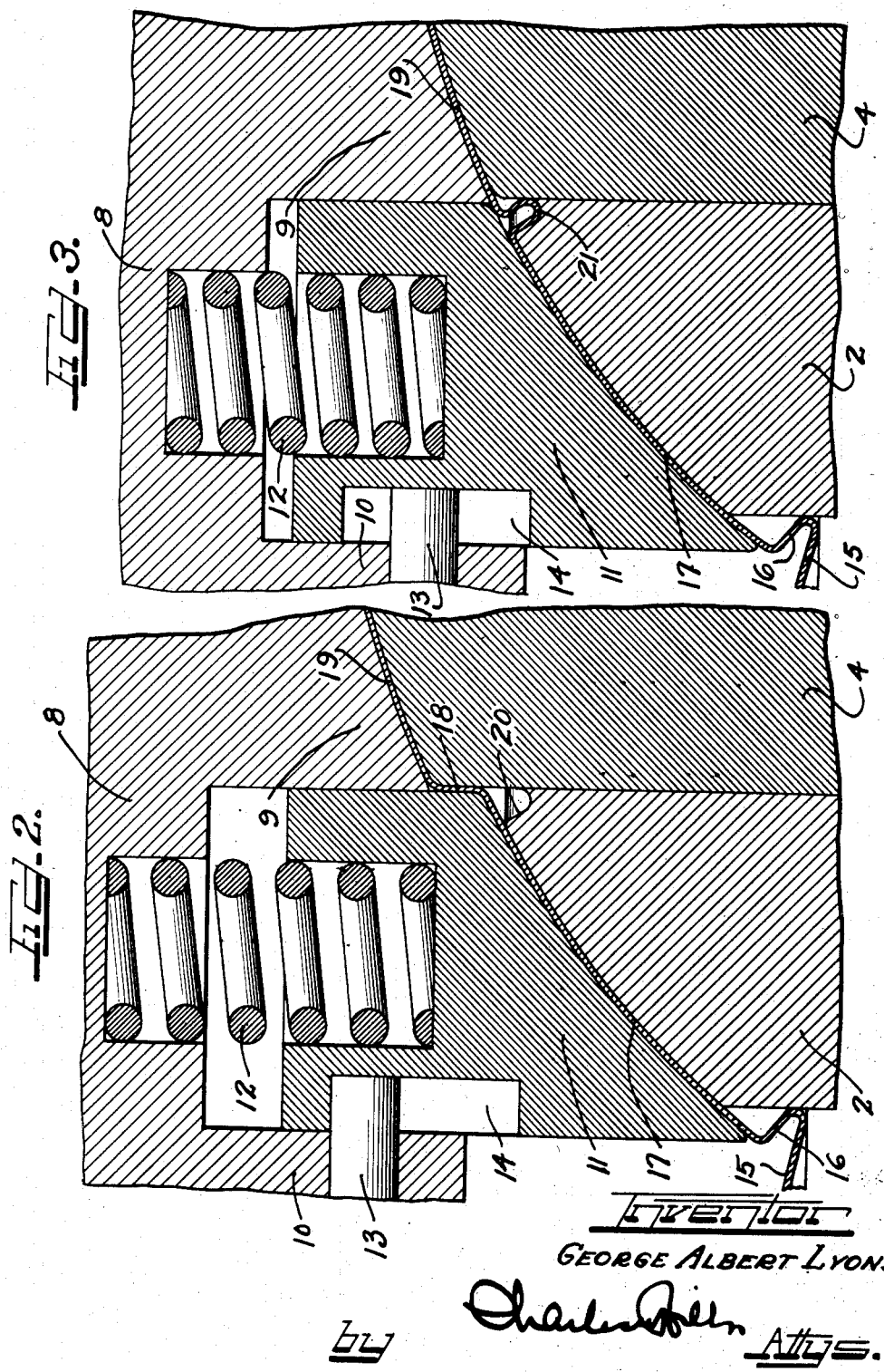

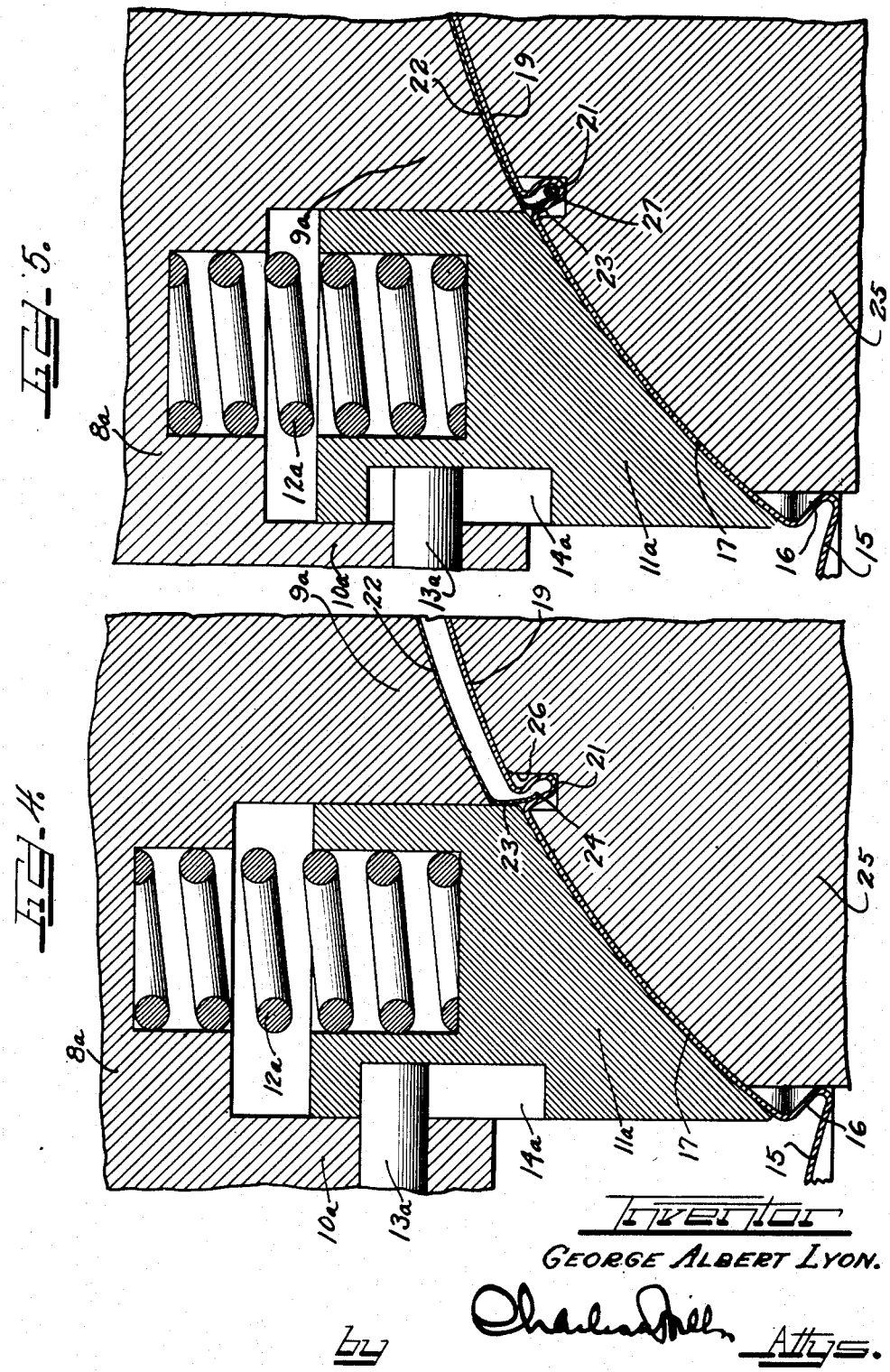

April 22, 1941.　　　　G. A. LYON　　　　2,239,368
METHOD OF FORMING A WHEEL COVER
Filed Aug. 2, 1937　　　4 Sheets-Sheet 4
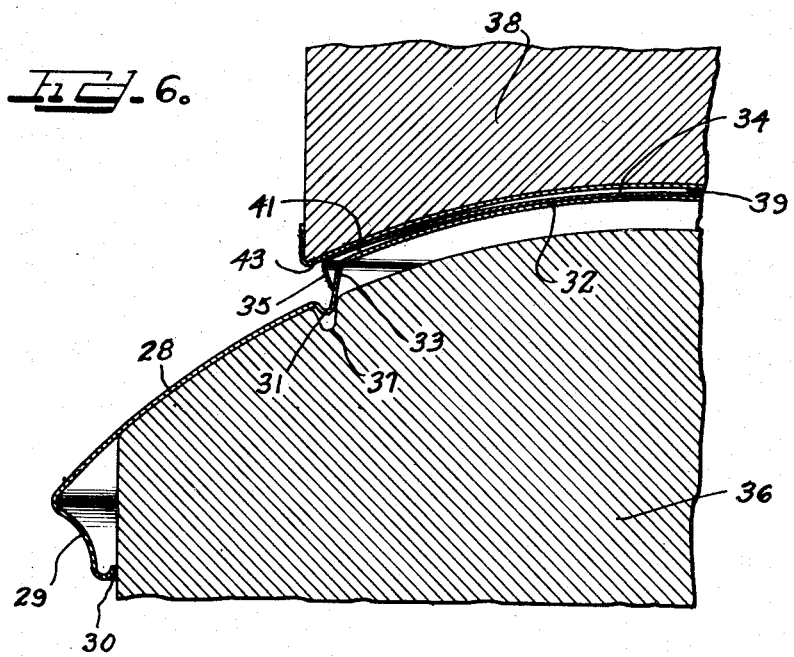
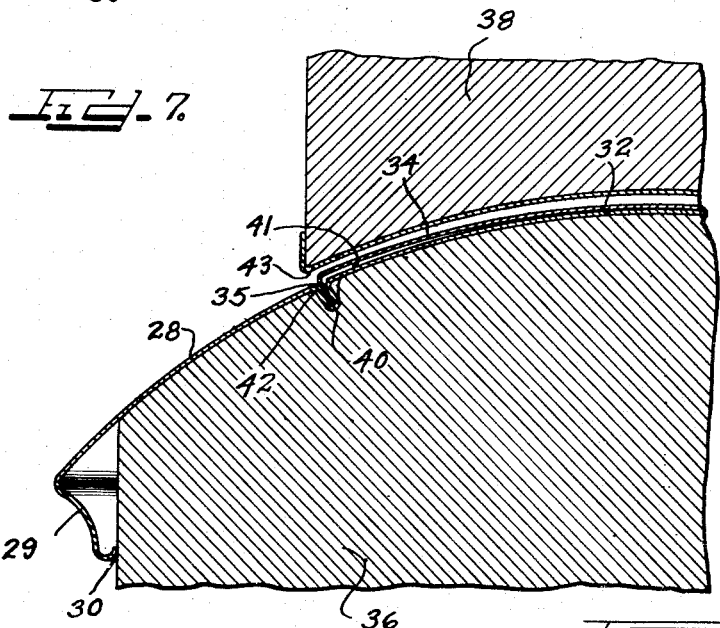
Inventor
GEORGE ALBERT LYON.

Patented Apr. 22, 1941

2,239,368

UNITED STATES PATENT OFFICE 2,239,368

METHOD OF FORMING A WHEEL COVER

George Albert Lyon, Allenhurst, N. J.

Application August 2, 1937, Serial No. 156,871

3 Claims. (Cl. 113—116)

This invention relates to improvements in a method of forming a wheel cover, the invention being highly desirable for use in connection with the forming of a vehicle wheel cover, such as a wheel disk part, a tire cover part, a hub cap part, or the like.

In the making of ornamental vehicle wheel coverings for disposition over the outer side surface of a wheel to enhance the appearance of the wheel and the vehicle as a whole, it has been found desirable to make the wheel covering proper out of a single piece of relatively economical metal, and then cover the portion of this piece which is most susceptible to injury with a piece of stock of comparatively higher grade metal, such as stainless steel. Therefore, it is desirable to have an economical and simple method for constructing the composite wheel covering and joining these two parts together. It is also desirable to be able to polish the stainless steel part prior to the joining operation where it can be more readily handled, and so eliminate a finishing operation after the joining operation has been completed. In addition, it is advantageous to have the added element not only in the form of a decorative medium but also in the form of a protective medium, both to prevent bumps and abrasions on the covering proper likely to cause rust and similar deteriorations, and also to eliminate the injurious effects of objects hurled against the wheel covering, and similar happenings.

I have provided a novel method for joining a combination protective and decorative element to a wheel covering proper by a simple die-forming operation, and that is an important object of the present invention.

It is also an object of this invention to provide a method of making a wheel covering including the joining of a combination decorative and protective member to a wheel cover proper contemporaneously with the shaping of the cover proper.

Another object of the invention is the provision of a novel method of interlocking a combination protective and decorative member to a wheel covering member.

A further object of the invention is the provision of a novel method of making a wheel cover including pre-forming the separate parts, so that they may be merely placed in juxtaposition and may be automatically guided to the proper relative positions and then interlocked by a simple operation in a novel manner.

My novel method also includes the step of forming a re-entrant groove in a disk proper to define a crown part, and interlocking a protective and decorative crown element in the re-entrant groove.

The method also contemplates the novel connection of a protective and decorative member to a wheel covering member after the decorative member has been externally finished in the desired manner, there being no finishing of this member necessary after the joining operation.

This invention also provides a method for connecting a protective and decorative member to a wheel covering member proper in a novel manner, the arrangement being such that many injuries to the wheel covering structure that would otherwise occur are eliminated, and many injuries that would leave unsightly results, with structures known heretofore, are transferred to an invisible part of the structure as a whole, even though injurious contact might have been made with a visible part.

It is also a feature of the invention to provide a simple and highly economical method of making a wheel cover structure.

Other objects and features of this invention will more fully appear from the following detailed description taken in conjunction with the accompanying drawings, which illustrate two embodiments of the invention, and in which:

Figure 1 is a fragmentary vertical sectional view, with parts in elevation, illustrating die mechanism for shaping a wheel cover in the form of a disk, showing the mechanism in an initial stage of operation;

Figure 2 is a fragmentary enlargement of the left-hand portion of Figure 1;

Figure 3 is a view similar to Figure 2, but showing the mechanism in a more advanced stage of operation;

Figure 4 is a fragmentary sectional view through die mechanism, showing parts in elevation, and illustrating an initial step in the connection of a combination protective and decorative element to the cover member shown in Figures 1, 2 and 3;

Figure 5 is a view similar to Figure 4, showing the completion of the connecting operation;

Figure 6 is a fragmentary sectional view of die mechanism, illustrating a modified method of attaching a combination protective and decorative member to a cover member proper, and illustrating an initial step in the operation; and Figure 7 is a view similar to Figure 6, showing the completed wheel cover structure, with the die members separated after the operation.

As shown on the drawings:

The illustrated mechanism shown in the various figures of the drawings may be varied through a wide range without departing from the principles and spirit of this invention. However, the illustrated structures, which are more or less diagrammatically illustrated, are sufficient for adequately disclosing both of the illustrated and described embodiments of my invention, and it will, of course, be understood that the invention is not limited precisely to the two embodiments set forth and described herein.

In Figures 1 to 3, inclusive, I have illustrated a method of forming a re-entrant groove in a wheel disk structure with the groove in position to substantially define a crown portion of the disk, which portion normally would overlie the hub of a wheel. In this instance, the disk structure is of the type that overlies the outer side surface of the vehicle wheel, being held in position upon the wheel by retaining means carried by the wheel, and the outer periphery of the disk falls within the outer circumferential edge of the tire rim.

The apparatus illustrated in these figures is in the nature of die-forming mechanism and includes a lower die or die block 1 having an upstanding solid die ring 2 defining an interior opening 3 above the base of the die block. Inside the opening 3 is a reciprocable die pad 4 normally urged outwardly by a plurality of springs 5 or the equivalent disposed in confronting recesses in the die pad and base of the die block. The outward movement of the pad is limited by one or more pins 6 rigidly mounted in the ring 2, each of which extends into a suitable slot 7 in the die pad. As seen in Figure 1, the die pad is in its outermost position, with the lower edge of the slot 7 in abutment with a pin 6.

The mechanism also includes an upper die 8 carrying a central depending die portion 9 complemental in character to the aforesaid die pad 4. Spaced from the central die part 9 is a depending fixed ring 10, and in the space between this ring and the die part is a reciprocable die ring 11, which is normally urged downwardly or outwardly by a plurality of springs 12, or the equivalent, each of which is seated in confronting apertures in the die 8 and die ring 11. The downward or outward movement of the die ring is limited by a plurality of pins 13 each firmly fixed in the stationary ring 10 and an end of which extends into a suitable recess 14 in the die ring. As the die ring is seen in Figures 1 and 2, it is in its outermost position with the inner horizontal edge of each respective slot abutting a pin 13.

The part to be formed by the die mechanism just above described is, in this instance, in the nature of a wheel disk, and includes an outer annular part 15 for overlying a portion of the vehicle wheel outside the retaining elements carried by the wheel, a goose neck curvature 16 joining the part 15 with an arcuate annular portion 17, in turn connected by a skirt 18 to a central raised crown portion 19. When the disk is applied to a vehicle wheel, the retaining means carried by the wheel engage behind the shoulder formed by the goose neck 16 and hold the entire disk structure firmly upon the wheel. It will be seen that in the initial stage, the crown portion 19 is distinctly elevated from the arcuate part 17 by the skirt 18, and the disk structure as above described is preformed in any suitable manner. The various parts of the die mechanism are shaped in conformity with the contour of the preformed disk, as seen in Figures 1 and 2.

For example, the fixed die ring 2 on the die block 1, and the reciprocable die ring 11 in the upper die 8 both have complemental faces of a shape in keeping with the arcuate portion 17 of the disk blank, and the arrangement is such that when the two die members are brought together, the major portion of this part 17 is firmly held unchanged, while the central part of the disk blank is undergoing a formation. In the same manner, the upper face of the die pad 4 and the lower face of the die 9 are complemental and in keeping with the general contour of the crown part 19 of the disk blank, so as to hold this crown part firmly therebetween and maintain the general shape of the crown part during the formation of the re-entrant groove.

In forming the disk blank, it is proposed to bring the crown portion 19 down until the outer curvature of this part is substantially in alignment with the curvature of the part 17, thus forming the re-entrant groove out of the skirt 18 and the immediately adjacent portion of the part 17. To this end, the fixed ring die 2 on the die block 1 is provided with an arcuately edged annular groove 20, the outer wall portion of the groove extending beneath a part of the reciprocable ring die 11, and the inner wall of the groove being the outer face of the reciprocable die pad 4, so that this wall is substantially straight.

When die members are brought together in a single operation, that portion of the part 17 of the blank above the groove 20 and the skirt 18 of the blank are formed into a re-entrant groove 21, as seen in Figure 3, and the crown portion 19 of the blank is substantially in alignment with the curved part 17. Owing to the amount of metal and the fact that the die part 19 is of slightly greater diameter than the die part 4, an inwardly extending undercut groove formation is provided, with the metal following the curvature in the die ring 2 and spacing itself away from the adjacent vertical wall of the die pad 4. In this manner, it is an extremely simple expedient to provide the re-entrant groove formation 21 in the disk blank.

It is next desirable to attach a combination decorative and protective element over a portion of the disk proper formed as above described. In this instance, the decorative element is attached over a portion of the disk proper which is most susceptible to injury in ordinary usage. Since, when the entire disk structure is attached to a vehicle wheel, the central crown portion will project axially outwardly beyond any other part, that portion is more susceptible to objects thrown against the wheel, curb abrasions and similar injurious occurrences. Accordingly, in the present instance, the decorative element will be attached over the crown portion 19 of the disk proper, which is now defined solely by the re-entrant groove formation 21, since after the above forming operation, the portion 19 is substantially in the same arcuate line of contour as the outer portion 17.

With reference to Figures 4 and 5, it will be seen that the combination decorative and protective part to be added is in the form of a crown element 22 having a central contour in keeping with the part 19 of the disk proper. The crown element is provided with an annular depending skirt 23 for disposition in the re-entrant groove formation 21. For purposes that will more fully appear later herein, the lower marginal portion of the skirt is somewhat inwardly turned, as indicated at 24 in Figure 4. The skirt 23 is so sized that when the disk proper is disposed over a die member, as seen in Figure 4, and the crown element 22 is laid thereupon, the skirt together with the turned portion 24 will extend within the groove formation 21 and thus serve to guide the two parts to the proper initial position. In view of the fact that the radially outermost wall of the groove formation is inwardly inclined and the skirt is also inwardly inclined, little care need be taken in positioning the crown element upon the disk proper, since it will automatically find its correct center relatively to the disk proper.

Die mechanism is also used for joining the crown element and disk proper, preferably in a single and simple operation. In this instance, the die mechanism includes a solid die block 25 provided with a comparatively straight walled annular groove 26 for the reception of the aforesaid groove formation 21. The die block 25 has an upper contour in keeping with the parts 17 and 19 of the disk proper. The goose neck curvature 16 on the disk proper preferably is in light engagement with the outer side wall of the die block.

Of course, the mechanism includes an upper die 8a, and in this instance the upper die is of substantially the same general construction as the upper die 8 previously described. It includes the central part 9a, the reciprocable die ring 11a positioned inside of the fixed ring 10a and urged outwardly by a plurality of springs 12a, the outward movement being limited by a pin 13a extending in a recess 14a, as above described. The difference between the die 8a and the previously described die 8 resides in the fact that the reciprocable die ring 11a is radially narrower than the die ring 11. It will be seen, with reference to Figures 4 and 5, that the die ring 11a extends just a little inwardly over the groove 26 in the die block, while the part 9a is of sufficiently larger diameter than the die part 9 to extend substantially over the groove formation 21. The underface of the die ring 11 is shaped complementally to the confronting part of the die block, so that the portion 17 of the disk proper is firmly held in position by the die mechanism during its operation. The underface of the die part 9a is shaped complementally to the confronting portion of the die block and in accordance with the contour of the crown portion 19 of the disk proper, so that during the operation the contour of this part of the disk proper does not change. Of course, the crown element 22 has its central portion of such configuration as to intimately fit the underface of the die part 9a.

With the parts so arranged, it is a simple expedient to bring the die members together to the position seen in Figure 5, thus causing the inner part 24 of the skirt 23 to curl around the inner wall of the groove formation 21 and assume the position indicated at 27 in Figure 5, thus firmly anchoring the crown element 22 to the disk proper. During this operation, with the die members shaped and disposed as above described, no change occurs in the groove formation 21. The disk is firmly held in position by the die block and the ring die 11a, so that the only metal free to move is the skirt part of the crown element 22, and since the lower margin is turned inwardly as at 24, this skirt part will follow around the inner curvature of the groove formation 21 and results in the curl 27.

The crown element 22 is preferably of stainless steel and may be given the desired finish prior to its connection with the disk proper. Of course, the die part 9a has a highly polished undersurface or else may be covered with chamois as explained later, or otherwise adapted to prevent any injury to the polished surface of the crown element. Usually, after the connecting operation, no further finishing is necessary upon the entire disk structure. It will be noted that the crown element 22 effectively protects the crown portion 19 of the disk proper and also lends a pleasing contrasting color scheme to the entire wheel cover structure. The part 17 of the disk proper may be given any desirable finish in keeping with the appointments of the vehicle. If it is not desired to leave the crown element 22 in a highly polished state, color may also be applied to this element.

In Figures 6 and 7, I have shown a modification of my method for joining a combination protective and decorative covering element to a disk proper to provide a wheel cover structure. In this instance, the re-entrant groove formation is completed, and the protective element added in the same operation. It will also be noted that the protective element in this instance affords an added amount and a novel type of protection as will later more fully appear.

In this instance, the disk proper includes an outer circumferential portion 28 terminating in an obliquely under-turned flange 29 having a partially rolled inner margin 30. The disk is designed for axial placement on a wheel, resilient retaining means or the equivalent carried by the wheel snapping over the turned margin 30 into the space between the flange 29 and the part 28 to hold the disk in position upon the wheel. It will be noted that the flange 29 together with the securing means are thereby concealed from view when the disk is in position upon the wheel. Inwardly, the portion 28 terminates in a partially defined re-entrant groove 31 (Figure 6) and radially inwardly of the groove, a crown portion 32 is defined by an upstanding skirt 33.

As in the previous embodiment, it is proposed to add a crown element over the crown part 32. In this instance, a crown element 34 is illustrated having a crown-like contour slightly at variance with the contour of the crown part 32. The crown element carries an annular inwardly inclined skirt 35, and when the parts are positioned as seen in Figure 6, it is simply necessary to lay the crown element 34 over the crown portion of the disk proper, and the abutment of the edge of the skirt 35 with the sloping wall of the skirt 33 automatically centers the crown element on the disk proper prior to assembly.

The mechanism used includes a die block 36 having an annular groove formation 37 and an upper surface on each side of the groove formation coinciding with the part 28 of the disk proper and the contour of the crown portion 32, respectively. An upper die 37 is used of sufficient diameter to extend outwardly over the groove 37 in the lower die and having an undersurface complemental to the crown curvature of the lower die, in keeping with the crown portion 32 of the disk proper which does not change shape during the operation.

In Figure 6, the die members are shown just prior to the closing operation, and it will be seen that due to the variance in shape of the crown element 34, a clearance 39 will appear between the central portion of the crown element and the upper die block 38.

In Figure 7, the dies 36 and 38 are shown in somewhat separated position after having been brought together to produce the desired formation and connection. Upon the compression of the dies, the skirt 33 of the disk proper is forced into a re-entrant groove formation 40, as seen in Figure 7, and the crown portion 32 is brought down substantially in the same line of contour as the outer part 28. Simultaneously with the formation of the groove 40, the skirt 35 of the crown element is pressed into this groove so that the crown element is firmly anchored to the disk proper. However, due to the variance in curvature of the crown element, upon the retraction of the dies, this element, being of stainless steel and flexible in character, recovers somewhat and springs away from contact with the crown part 32, as indicated at 41. Before the joining operation, with reference to Figure 6, it will be seen that the crown element contacts the crown portion 32 of the disk in the central region, but the space 41 is apparent around the central region. After formation and the separation of the die elements, the crown element springs away from the crown 32 of the disk and the space 41 remains. It will be noted that the groove 40 is substantially wider than the skirt 35, so that when the dies are brought together with sufficient force to hold the crown part 32 in its original contour, the crown element merely spreads towards the shoulder 42 between the part 28 and the groove 40, and upon retraction of the upper die, the crown element springs back away from the crown part 32 to the position seen in Figure 7.

A particular protective advantage results from this construction. It is preferable to form the disk proper of a relatively economical steel, while the crown element is formed preferably of stainless steel. The crown element is therefore sufficiently flexible to withstand many light blows or abrasions that would otherwise leave a mark upon the disk proper. The crown element is also sufficiently flexible that when certain objects are hurled against the disk structure or blows occur thereon, the crown element flexes with the blow, and even though the blow may be of sufficient force to dinge or otherwise mar the disk proper, the crown element will not be so affected. In other words, while contact is made against the outer surface of the crown element, the effect of the blow is transmitted to the disk proper, and if a dinge results, it is not apparent to the eye since it will be effectively concealed by the crown element. It has been found by test that dinges may be made in the crown part 32 without any visible indication of the blow on the crown element itself.

Prior to the joining of the crown element of the disk proper, the crown element is preferably completely finished and most frequently, the finish will be in the form of a high polish. In order to preserve this polish, the upper die 38 must either have a polished lower face or be covered with a piece of chamois 43 or the equivalent. Of course, the outer portion 28 of the disk proper may be given any desirable finish in keeping with the appointments of the vehicle, and a nice contrasting color effect may be obtained between the part 28 and the crown element 34.

In view of the foregoing, it is apparent that I have provided a new and novel method of making a wheel cover structure, which method results in a highly efficient structure, and is quite simple, expeditious and economical to practice.

While I have set forth and described herein two separate embodiments of my method, it should be understood that the method is not so limited, but only insofar as defined by the scope and spirit of the appended claims.

I claim as my invention:

1. In making a wheel cover structure, the method of joining separate parts, one having a re-entrant groove and the other having a depending skirt, including placing the skirt in the groove, and curling the edge of the skirt into a bead while in the groove to prevent removal.

2. The method of applying a piece of thin sheet metal to the surface of an object which comprises forming a groove around the edge of the area of said object to be covered, said groove having a rounded bottom, the space above said bottom being unobstructed for a height equal to or greater than about twice the radius of transverse curvature of said bottom, and the inner side of said groove on opposite sides of said area converging down away from said surface, providing a piece of thin sheet metal shaped to fit said area and having a depending flange slightly wider than the depth of said groove, and forcing said flange down into said groove along the outer wall thereof and thereby causing the edge of said flange to be curled into a bead by said rounded bottom and causing the side of said bead to engage the converging inner side of the groove and thereby accurately retain said piece of thin sheet metal in position independently of the accuracy of the width of said flange prior to assembly.

3. The method of forming a groove in a wheel covering member having a crown portion and an outer part joined by an upstanding skirt, including supporting said outer part in an area close to said skirt while leaving said outer part unsupported next to said skirt, and forcing the unsupported portion of said outer part down to form at least a part of one wall of said groove and simultaneously forcing said skirt down to form the other wall of said groove.

GEORGE ALBERT LYON.